Dec. 21, 1954     V. R. TROGLIONE     2,697,596
MAGNETIC BRAKE FOR QUENCHING APPARATUS
Filed July 22, 1952     2 Sheets-Sheet 1

INVENTOR.
VINCENT R. TROGLIONE.
BY
ATTORNEYS.

Dec. 21, 1954  V. R. TROGLIONE  2,697,596
MAGNETIC BRAKE FOR QUENCHING APPARATUS
Filed July 22, 1952  2 Sheets-Sheet 2

INVENTOR.
VINCENT R. TROGLIONE.
BY
ATTORNEYS.

United States Patent Office 2,697,596
Patented Dec. 21, 1954

2,697,596

MAGNETIC BRAKE FOR QUENCHING APPARATUS

Vincent R. Troglione, Pittsburgh, Pa., assignor to Loftus Engineering Corporation, Pittsburgh, Pa., a corporation of Maryland Application July 22, 1952, Serial No. 300,280

10 Claims. (Cl. 266—4)

This invention relates to an improvement in heat treating apparatus for ferrous metal articles and comprises in conjunction with a delivery chute for introducing the articles into a quench tank the provision of a magnetic brake for slowing the movement of the articles as they emerge from the chute.

Heat treating apparatus of the type with which this invention is concerned commonly comprises a hardening furnace, a quench tank, a draw furnace, and conveyor mechanism for handling the articles in a continuous manner. The exit end of the hardening furnace has a conveyor chute which accepts the articles from the conveyor mechanism therein and is inclined downwardly into the quench tank located between the two furnaces. This conveyor chute has its lower end immersed in the liquid of the quench tank and delivers the articles being treated to conveyor mechanism therein for transmission to the draw furnace. Very frequently, the articles being treated, such as plow points and other ground engaging tools, shells and the like, have sharp edges which are damaged by striking against the conveyor or other mechanism in the quench tank when they emerge from the lower end of the conveyor chute. Damage of this character is particularly common in the case of shells and other hollow articles which are delivered through a cylindrical chute onto a nozzle projecting axially toward the end of the chute for delivering a stream of liquid to the interior of the shell or hollow article. In such case, the leading edge of the hollow article may strike against the tip of the nozzle and be damaged thereby.

One of the principal objects of this invention is to eliminate the possibility of damage to articles gravitating into the quench tank through a conveyor chute. To this end, the lower end of the conveyor chute is provided with an apparatus for creating a magnetic field in the path of articles gravitating therethrough to thereby slow the movement of the articles as they emerge from the chute much in the manner of a magnetic brake. The magnetic field may be produced by the provision of permanent magnets or suitable electro-magnets. Regardless of the type of magnet used, it must be of such strength and be so located that the lines of flux of its magnetic field will be cut by the article as it gravitates through the conveyor chute.

Other objects and advantages of the invention will become apparent from the following description.

In the drawings, there are illustrated several embodiments of the invention. In this showing:

Figure 1:
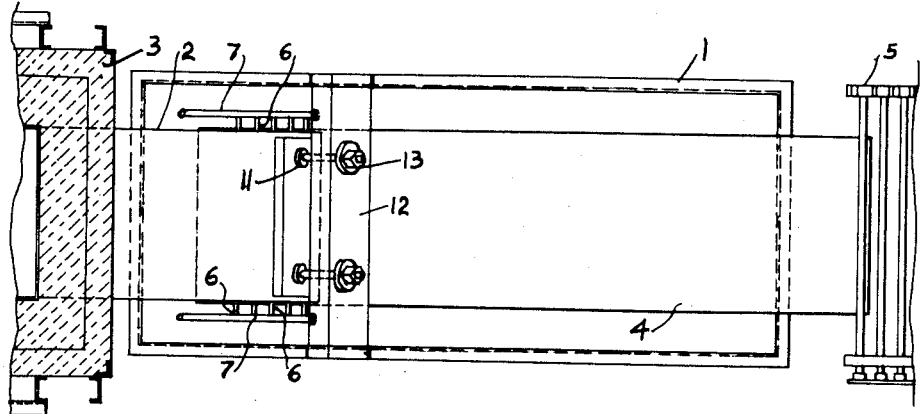
Fig. 1 is a plan view of a quench tank having a delivery chute provided with a magnetic brake in accordance with the principles of this invention, a portion of the furnace in which the upper end of the delivery chute is located being shown fragmentarily in horizontal section, and the conveyor mechanism at the lower end of the chute being illustrated somewhat schematically.
Figure 2:
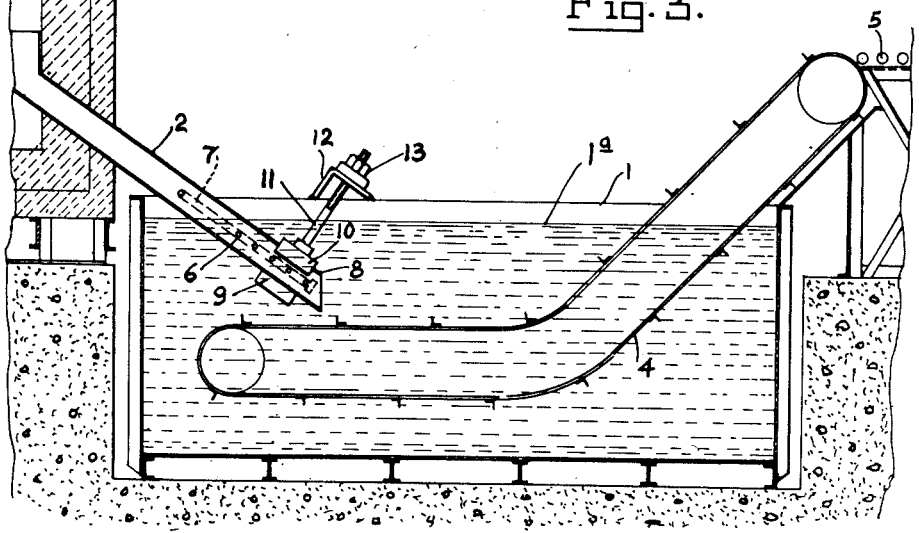
Fig. 2 is a sectional view taken vertically of the showing of Fig. 1.

Referring to Figs. 1 and 2 of the drawings, the numeral 1 designates a quench tank containing a quenching medium, oil or otherwise, into which ferrous metal articles are introduced as a part of a heat treating operation. The quench tank may be provided with the usual appurtenances (not shown) customary in the art for regulating the temperature and other conditions of the quenching fluid therein. The ferrous metal articles to be treated gravitate into the tank 1 through a delivery chute 2 which has its lower end immersed in the quenching fluid and its upper end at the exit of a hardening furnace 3. Conveyor mechanism (not shown) in the furnace 3 delivers the heated articles to chute 2 through which they gravitate into the tank for a quenching operation. The lower end of the chute 2 is positioned above a conveyor belt 4 which receives the articles and carries them out of the quench bath and delivers them to a conveyor mechanism 5 for transmission through a draw furnace (not shown).

The chute 2 is rectangular in shape and has openings in its sides through which the ends of nozzles 6 project. Each of the nozzles is connected to a conduit 7 which is supplied with quenching fluid under pressure from a pump (not shown) so that streams of fluid will be delivered to the interior of the chute 2. In this manner, fluid is circulated continuously through the chute and excessive temperature rises therein due to the heat of the articles being quenched is prevented.

As indicated above, articles gravitating out of the lower end 8 of the chute may be damaged when they strike against the upper run of the conveyor 4. To prevent or minimize such damage, the chute is provided with a magnetic brake for slowing the movement of the articles therethrough. As shown in Figs. 1 and 2, the brake comprises a pair of permanent bar magnets 9 and 10 which are mounted in the tank 1 below the surface level 1a of the quenching liquid therein. The magnet 9 is rigidly secured to the underside of the chute 2 by suitable supports (not shown). The magnet 10 is positioned directly opposite the magnet 9 and is adjustably supported for movement toward and away from the magnet 9 through an opening formed in the top side of the chute 2. The adjustable support for the magnet 9 comprises a pair of rods 11 having their lower ends secured to the magnet 10 and their upper ends projecting through openings in a bracket 12 extending transversely of the sides of the tank 1. Nuts 13 threaded on the upper ends of the rods 11 provide an adjustable support for the rods 11 on the bracket 12 by which the position of the magnet 10 may be varied with respect to the magnet 9 to vary the strength of the magnetic field between such magnets.

The magnets 9 and 10 are so positioned and magnetized that there is a magnetic field extending transversely of the chute 2, the lines of flux of which extend perpendicular to the facing surfaces of the magnets 9 and 10. These lines of flux are cut by the articles sliding and gravitating through the chute 2, and the speed of movement of the articles is slowed thereby so that they are not damaged by striking the conveyor 4.

Figure 3:
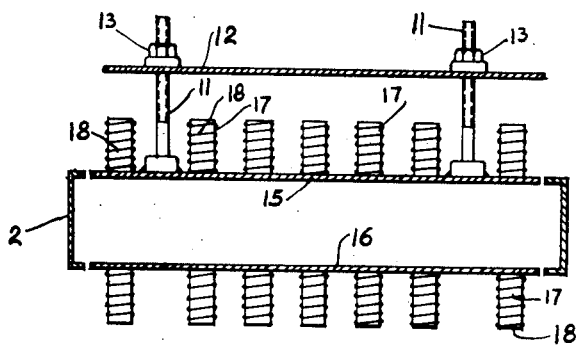
Fig. 3 is a sectional view taken transversely of the delivery chute of Fig. 1 and showing a modified form of magnetic brake.

While the magnetic brake of Figs. 1 and 2 is provided by a pair of permanent magnets, the magnetic field for providing the desired braking effect may be created by electromagnets. A showing of this modification is illustrated in Fig. 3 in which the upper and lower walls of the chute 2 are shown as being provided with movable sections 15 and 16. Each of the sections 15 and 16 preferably has an area and rectangular contour similar to that of the magnets 9 and 10. To provide the magnetic field, the sections 15 and 16 are each provided with a plurality of electro-magnets respectively comprising an iron core 17 and an energizing coil 18. The upper section 15 is provided with an adjustable support comprising the parts 11, 12 and 13 as explained in connection with Fig. 2. The coils 18 will be suitably connected to an alternating current circuit (not shown) having adjustable means such as a rheostat for varying the strength of the magnets. The field produced by the coils 18 will be cut by the articles sliding over the lower section 16 and the movement of the articles will be slowed an amount depending on the strength of the magnetic field.

Figure 4:
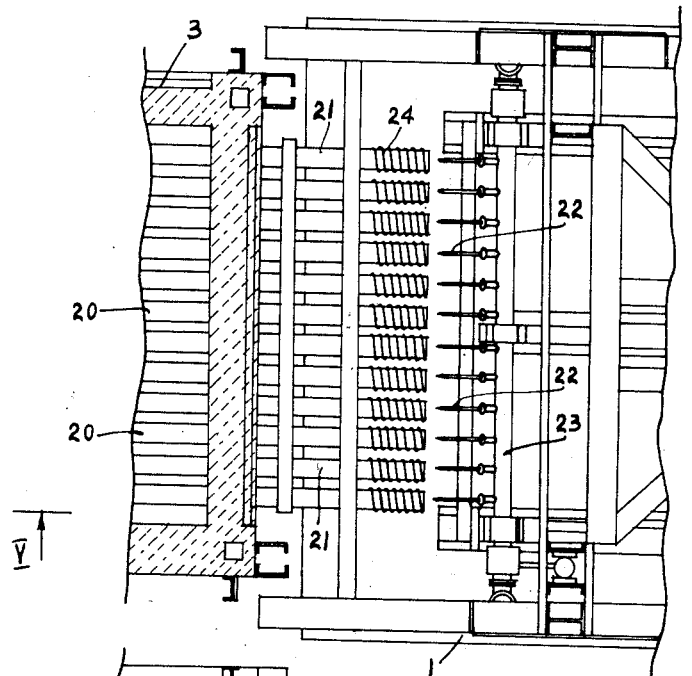
Fig. 4 is a fragmentary plan view similar to Fig. 1 illustrating an application of the principles of this invention to an apparatus for heat treating artillery shells.
Figure 5:
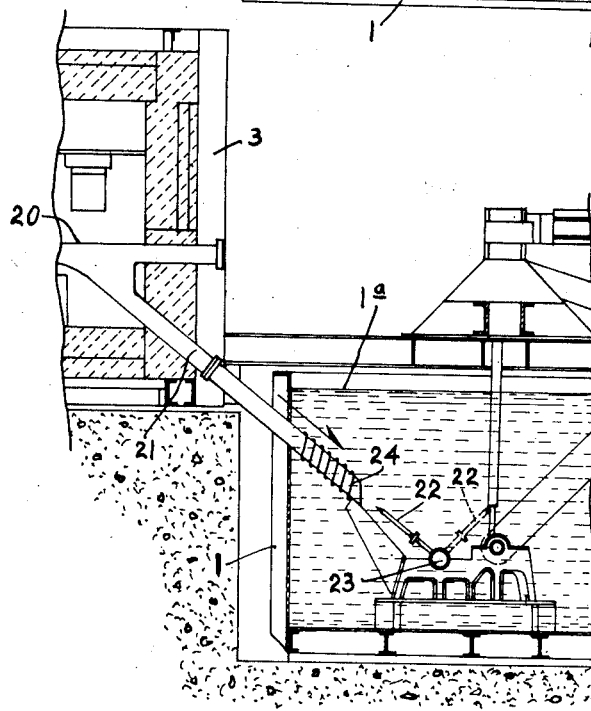
Fig. 5 is a sectional view taken substantially along the line V—V of Fig. 4.

Figs. 4 and 5 show an adaptation of the invention to a heat treat line for artillery shells. In this showing the hardening furnace 3 is provided with a plurality of tubes 20 through which the shells are delivered continuously in end-to-end relation. The ends of the tubes 20 are connected with downwardly extending cylindrical chutes 21 which project into a quench tank 2. A nozzle 22 is provided at the lower end of each tube 21 for delivering a jet of fluid into the end of one of such tubes to insure that fluid will be introduced into the open end of the shell gravitating therethrough. The shells coming out of the lower ends of the tubes 21 are received on the nozzles 22 which are then rotated by the fluid pressure supply line 23 to which they are connected to the position designated by dotted lines in Fig. 5 for the purpose of transferring the shells to a conveyor mechanism (not shown) in the quench tank. The parts of the apparatus of Figs. 4 and 5 thus far described are conventional. To slow the movement of the shells as they emerge from the tubes 21, the lower end of each is provided with a coil 24 which is connected in a suitable alternating current circuit as described in connection with the coils 18 of Fig. 3. The coils 24 produce a field within the tubes 21 which is cut by the shells gravitating therethrough to slow their movement. The strength of the field produced by the coils 24 in the interior of the tubes 21 will be sufficient to provide the desired deceleration of the articles moving therethrough for preventing damage to the shells when they strike the nozzles 22 or other parts in the quench tank 2.

While it is contemplated that the magnet elements providing the magnetic braking effect of this invention shall be applied to chutes, such as those designated by the numerals 2 and 21, which have been constructed of iron, it will be understood that such chutes may be constructed of non-ferrous or non-magnetic materials, such as copper, aluminum, plastic, and the like, if the iron of the chutes interferes with producing a magnetic field in which the lines of force traverse the path of movement of the articles as they are delivered to a quenching tank. In addition, and while the invention has been described as applied to the treatment of ferrous metal articles, it is to be understood that it is equally well adapted to apparatus for the heat treatment of other metal articles, such as those fabricated of aluminum, which are subject to a magnetic braking effect.

In connection with the modification of Figs. 4 and 5, the energizing coils 24 have been described as being mounted concentric of the tubes 21. In place of concentric coils 24, spaced pairs of electro-magnet elements such as those illustrated in Fig. 3 may be utilized. In such case, aligned pairs of cores 17 with energizing coils 18 would be placed with adjacent and facing end surfaces in abutting relationship with the surface of the tube 21 on opposite sides thereof so that the flux lines produced will be perpendicular to the axis of the tube 21 and will be cut by the articles gravitating therethrough. Moreover, although the coils 18 and 24 have been described as energized by alternating current, it is to be understood that such coils may be energized by direct current if available. In the case of energization by direct current, the magnetic flux will not alternate, but alternation is unnecessary to an effective braking action. Should the concentric coils 24 be energized by direct current, it will be appreciated that the magnets will initially accelerate the downward movement of the articles before exerting a braking action thereon.

With respect to adjustability of position, the mounting provided by the parts 11—14 provides for adjusting the relative positions of the magnets 9 and 10, or 15 and 16, toward and away from each other to thereby vary the flux density of the magnet fields and the force of the braking action. In addition, the position of such magnets may be adjusted by a suitable mounting (not shown) up or down the slope of the chutes 2 and 21 to vary the point in the downward movement of the articles at which they are subjected to the braking action. The adjustment of the position of the magnets along the slope of the chutes may be desirable to insure cooling of the metal articles by the quenching fluid to a temperature at which they are responsive to magnetic fields, it being a known phenomenon that metals heated above certain given temperatures do not respond to the action of a magnet. The magnets 9 and 10, as well as the electro-magnets which include the coils 18 and 24, are located under the surface 1a level of the quench liquid in the tank 1, and sufficiently far down the slope of the conveyor that the articles being treated will, in moving through the liquid, be cooled to a temperature at which a braking action can be had prior to movement of the articles into the magnetic braking field.

It is to be further understood that the several modifications of the invention illustrated and described herein represent preferred embodiments thereof, and that other changes and modifications may be made within the scope of the appended claims.

I claim:

1. In heat treating apparatus for metal articles, the combination with a downwardly inclined chute for delivering the articles by gravity from a heating furnace onto conveying mechanism in a quenching tank and having its delivery end below the surface level of the quenching fluid in the tank, of a magnetic brake positioned between said chute delivery end and quenching fluid surface level for slowing the gravitational movement of the articles adjacent the lower end of the chute.

2. In heat treating apparatus for metal articles, the combination with a downwardly inclined chute for delivering the articles by gravity from a heating furnace onto conveying mechanism in a quenching tank and having its delivery end below the surface level of the quenching fluid in the tank, of means positioned between said chute delivery end and quenching fluid surface level for producing a magnetic field in which the lines of flux traverse the path of movement of the articles through the chute to thereby slow the speed of movement of the articles therethrough.

3. Apparatus as defined in claim 2 characterized by said magnetic field producing means comprising a pair of permanent magnets respectively mounted in position on opposite sides of the chute.

4. Apparatus as defined in claim 2 characterized by said magnetic field producing means comprising an electro-magnet including an alternating current energizing coil therefor.

5. In heat treating apparatus for metal articles, the combination with a downwardly inclined chute for delivering the articles by gravity from a heating furnace onto conveying mechanism in a quenching tank and having its delivery end below the surface level of the quenching fluid in the tank, of a magnet positioned between said chute delivery end and quenching fluid surface level for producing a magnetic field in which the lines of flux traverse the path of movement of the articles through the chute, and a support mounting the magnet on the tank in position adjacent the end of the chute, said support including an adjustable connection by which the position of the magnet relative to the chute may be adjusted.

6. In heat treating apparatus for metal articles, the combination with a downwardly inclined chute for delivering the articles by gravity from a heating furnace onto conveying mechanism in a quenching tank and having its delivery end below the surface level of the quenching fluid in the tank, of a magnet positioned between said chute delivery end and quenching fluid surface level for producing a magnetic field in which the lines of flux traverse the path of movement of the articles through the chute, a supporting bracket mounted transversely of the upper edges of the quenching tank, supporting elements depending from said bracket and having connections at their lower ends with said magnet to mount the magnet in position adjacent the lower end of said chute, and an adjustable connection for varying the length of said elements to thereby vary the position of said magnet with respect to said chute.

7. In heat treating apparatus for metal articles, the combination with a tubular chute for delivering the articles by gravity from a heating furnace into a quenching tank and having its delivery end below the surface level of the quenching fluid in the tank, of means positioned between said chute delivery end and quenching fluid surface level for producing a magnetic field interiorly of the tube to provide magnetic lines of force which must be cut by the gravitational movement of the articles through the tube, said means comprising an alternating current energizing coil mounted concentrically of said tube adjacent its lower end.

8. In heat treating apparatus for metal articles, the combination with a quenching tank containing quenching fluid, a heating furnace, a delivery chute extending downwardly into said tank to a point below the surface level of the quenching fluid therein for delivering articles by gravity from said furnace into said tank, and a conveyor for receiving the articles as they emerge from the lower end of said chute, of means for slowing the movement of the articles as they reach the end of said chute comprising a magnet between said point and the surface level of the quenching fluid for producing a magnetic field having magnetic lines of force crossing the path of movement of the articles through said chute.

9. In heat treating apparatus for metal articles, a quenching tank containing a body of quenching fluid, a delivery chute extending into the tank and having its lower end positioned below the surface level of the fluid in the tank, and a magnetic brake mounted in operative position on the chute between said lower chute end and the liquid surface level for creating magnetic lines of force in the path of movement of the article through the quenching fluid.

10. In heat treating apparatus for metal articles, a quenching tank containing a body of quenching fluid therein, means positioned below the surface of said quenching fluid for producing an electro-magnetic field within said fluid body, and a chute for delivering the articles to be treated by gravity through said field.

References Cited in the file of this patent

UNITED STATES PATENTS

| Number | Name | Date |
|---|---|---|
| 1,103,358 | Hess | July 14, 1914 |
| 1,747,934 | Heidenhain | Feb. 18, 1930 |
| 1,779,604 | Knerr | Oct. 28, 1930 |
| 2,074,312 | Schraishuhn | Mar. 16, 1937 |
| 2,322,777 | Purnell | June 29, 1943 |
| 2,393,243 | Franz | Jan. 22, 1946 |
| 2,415,376 | Strickland | Feb. 4, 1947 |
| 2,604,971 | Snyder et al. | July 29, 1952 |